E. Hamilton,

Car Ventilator.

No. 230. Reissued Feb. 15, 1853.

UNITED STATES PATENT OFFICE.

EDWARD HAMILTON, OF BRIDGEPORT, CONN., ASSIGNOR TO H. B. GOODYEAR, ADMINISTRATOR OF NELSON GOODYEAR.

IMPROVEMENT IN EXCLUDING DUST FROM RAILROAD-CARS.

Specification forming part of Letters Patent No. 8,121, dated May 27, 1851; Reissue No. 230, dated February 15, 1853.

*To all whom it may concern:*

Be it known that I, EDWARD HAMILTON, of Bridgeport, Fairfield county, Connecticut, have invented a certain Improvement in Excluding Dust from Railroad-Cars; and I do hereby declare that the following is a full, clear, and exact description thereof, reference being had to the accompanying drawings, making part of this specification, in which—

Figure 1:
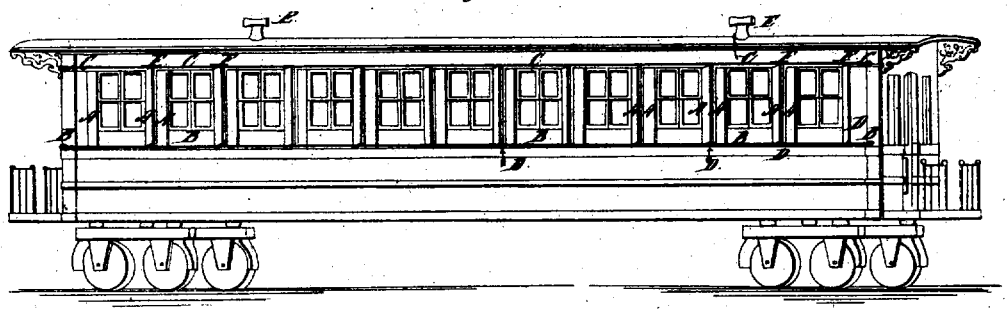
Figure 2:
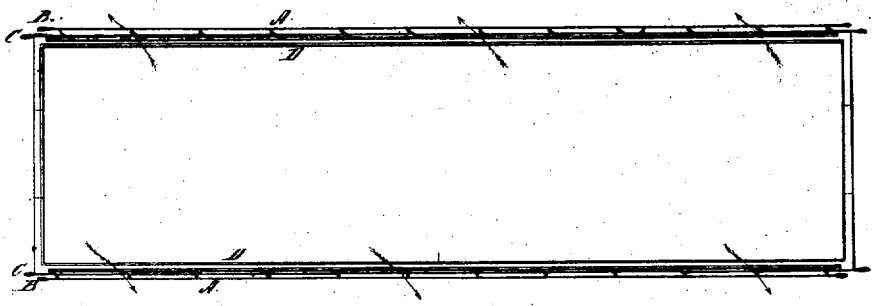

Figure 1 is a perspective view of a railroad-car with my improvement attached thereto, and Fig. 2 a horizontal section thereof.

The same letters indicate like parts in both figures.

The object of my invention is to prevent dust, cinders, and sparks from entering the windows of railroad-cars, which I effect by causing currents of air to pass from the inside of the car outward through the windows by exhaustion, air being admitted to the inside of the cars to supply the currents through the ventilators suitably located, and this object I effect by the application to railroad-cars of the well-known principle that the passage of a current of air along the outside of a tube will induce an outward current of air from the inside of such tube.

The nature of my invention consists in inducing outward currents of air through the windows of railroad-cars to prevent the entrance of dust, cinders, and sparks by the action of the surrounding air on deflectors combined with apertures of the windows, and forming an angle with the sides of the car, that the surrounding air may act on the oblique surfaces of such deflectors, and thus induce outward currents through the apertures of the windows.

I construct my railroad car in any of the known forms, and apply thereto all the ordinary appendages of such cars, the space between the windows of the same being about twelve inches to accommodate the blinds when folded together; but in order to induce currents of air from the inside of the car outward through the windows when opened, thereby preventing the entrance of dust, cinders, smoke, &c., into the same, I attach on the outside of the car the vertical blinds or deflectors A A to the window-frames D D, or other adjacent parts, as shown in the accompanying drawings. The blinds or deflectors are attached to the car by india-rubber or other hinges extending the whole length of the blinds.

To the upper end of all the blinds or deflectors, on the same side of the windows, and the lower end of all the blinds on the opposite side of the windows near the outer edges of the blinds, I attach rods, (B lower rod, C upper rod,) running the whole length of the car, for the purpose of opening and closing the blinds. The rods are perforated at the places where they are connected to the blinds, and fastened by means of pins F in the ends of the blinds. The upper rod operates one set of blinds and the lower rod the other set on the same side of the car. When the car is in motion, I open the blinds or deflectors by means of the rods to form an angle of about forty-five degrees with the sides of the car, the surface of such deflectors forming an obtuse angle. A current of air through the windows from the inside of the car outward is thereby induced, the air entering the car through the ventilators E on the top of the car, and the entrance of dust, cinders, smoke &c., into the car thereby prevented.

I have thus described the mode of application of the principle of my invention which I deem to be best; but it will be obvious that the mode of application may be greatly varied within the range of my invention, which, as above stated, consists in causing the action of the surrounding air as the car is in motion to impinge on oblique surfaces connected with the sides of the car and at or near the apertures of the windows to induce outward currents through the apertures of the windows. I do not wish, therefore, to be understood as limiting myself to the mode of application herein specified, but to cover all modes which are substantially the same, and which operate on the same principle.

What I claim as my invention, and desire to secure by Letters Patent, is—

Inducing outward currents of air through the windows of railroad-cars to prevent the entrance of dust, &c., by the action of the surrounding air on deflectors, combined with the sides of the car, substantially as specified, and operating on the principle set forth.

E. HAMILTON.

Witnesses:

ALEX. PORTER BROWNE,
CHAS. N. BAMBURGH.